United States Patent [19]
DeHaan

[11] 3,939,730
[45] Feb. 24, 1976

[54] HOUSING FOR MOTORCYCLE DRIVE CHAIN

[76] Inventor: Robert D. DeHaan, 775 SE. 16th St., Hillsboro, Oreg. 97123

[22] Filed: Oct. 8, 1974

[21] Appl. No.: 513,077

[52] U.S. Cl. ............................... 74/611; 184/15 R
[51] Int. Cl.[2] ............................................ F16P 1/00
[58] Field of Search ........... 74/611; 184/15 R, 13 R, 184/6.27

[56] References Cited
UNITED STATES PATENTS

| | | | |
|---|---|---|---|
| 1,717,365 | 6/1929 | Bremer | 184/15 R |
| 1,788,992 | 1/1931 | Ecabert | 74/611 |

FOREIGN PATENTS OR APPLICATIONS

| | | | |
|---|---|---|---|
| 523,701 | 7/1940 | United Kingdom | 74/611 |
| 958,995 | 3/1950 | France | 74/611 |

Primary Examiner—Samuel Scott
Assistant Examiner—F. D. Shoemaker
Attorney, Agent, or Firm—Chernoff & Vilhauer

[57] ABSTRACT

A self-contained housing for the drive chain of a conventional chain-driven motorcycle comprising a front section, enclosing the motorcycle drive sprocket and a portion of the drive chain, and a rear section, enclosing the rear wheel sprocket and the remaining portion of the chain, both sections being joined together by a flexible coupling to form a single, integrated unit. Sealing interfaces are provided where the housing mates with the motorcycle transmission case and the rear wheel hub to prevent contaminants from entering the housing and also to prevent leakage of a pool of lubricating oil that is maintained within the housing to continuously lubricate the drive chain and sprocket. The forward end of the housing is reinforced to prevent the chain from flying loose and causing injury to the motorcycle operator or damage to the engine casing should the chain break while it is in motion.

10 Claims, 8 Drawing Figures

HOUSING FOR MOTORCYCLE DRIVE CHAIN

BACKGROUND OF THE INVENTION

The present invention relates to a protective housing for a motorcycle drive chain. Most conventional motorcycles sold today utilize an endless chain to transmit power from a drive sprocket mounted on the motorcycle's transmission output shaft to a second sprocket mounted on the rear wheel. These sprockets and drive chain are often not provided with any kind of protective enclosure and, as a result, the chain is exposed to contamination from air, moisture, and dirt. Evaporation of the lubricating oil from the chain into the air, rust caused by the moisture, and increased wear caused by the abrasive effect of the dirt that adheres to the oily surface of the chain all increase the likelihood that the chain will fail under stress. Increased chain wear due to insufficient lubrication is of special consequence with larger motorcycles where new chains cost around $25.00 apiece and must be replaced every 3000 to 6000 miles. If the chain does break during operation, it may be dangerously whipped forward by the drive sprocket with a potential for causing serious injury or damage to the motorcycle operator or engine casing.

In addition, the exposed chain and sprockets are especially hazardous to the motorcycle and passenger, portions of whose anatomy or clothing may become entangled in the running chain and result in serious injury before the motion of the chain can be stopped.

Even when a chain guard is provided, it usually amounts to little more than a thin metal or plastic fender over the topmost portion of the chain. At best, this type of chain guard offers some protection for the operator and passenger against the danger of entanglement in the moving chain or injury from broken chain, but it offers no protection for the chain against insufficient lubrication due to evaporation or contamination from moisture and dirt.

SUMMARY OF THE INVENTION

The present invention is directed to a protective housing for the drive chain employed in a conventional motorcycle to transmit power from the transmission output shaft to the rear wheel and, more particularly, to a self-contained housing that completely encloses the motorcycle drive sprocket, drive chain, and rear wheel sprocket. The housing comprises two major sections: a front or drive sprocket section that encloses the transmission drive sprocket and about one-fifth of the chain between the drive sprocket and the rear wheel, and the rear or wheel sprocket section that encloses the rear wheel sprocket and the remaining four-fifths of the drive chain. These two components are joined together by two lengths of flexible neoprene or rubber hose to form a single integrated unit that encloses not only the two sprockets, but also the entire length of the drive chain. Oil-tight seals are provided where the housing mates with the transmission housing and the rear wheel hub to prevent water, dirt, and other contaminants from entering the housing and also to prevent the escape of an oil bath maintained within the housing.

The forward edge of the front section is constructed from one-quarter inch steel and serves as an impenetrable barrier to chain fragments in case of chain failure, thus protecting both the motorcycle operator and engine casing from serious injury or damage from flying chain. Any damage caused by the chain breaking during operation will be limited to the chain itself and possibly the drive sprocket and front section of the housing. All of these items can be readily and economically removed and repaired or replaced compared to the time and expense involved in repairing or replacing a damaged engine casing.

An oil filler port and an oil drain port are included in the rear section of the housing to facilitate the maintenance of a lubricating oil bath within the housing at a level sufficient to insure continuous partial immersion of the lower portion of the rear wheel sprocket. As the drive chain makes its way around the rear sprocket, it will be pulled through the oil bath and thereby provided with continuous cleaning and lubrication. Since the chain housing completely seals the chain and both sprockets, any oil flying off of the chain as it leaves the oil bath will impinge upon and run down the sides of the housing and back into the bath rather than sticking and adhering to the other components of the motorcycle or the operator's clothing as is the case with conventional non-enclosed motorcycle chains. The oil filler port is located at the desired surface level of the oil bath when the motorcycle is not operating and serves as both a filler port and an oil level inspection port. The oil drain port is located at the lowermost point of the housing to allow complete draining of both the oil bath and any accumulated impurities.

Flexible neoprene or rubber hose segments are used to join the front housing section to the rear section to allow the necessary flexing of the housing as the rear wheel moves up and down according to the surface of the road and the weights of the motorcycle operator and passenger.

As the drive chain and sprockets are completely enclosed by the housing, the chain is protected from the harmful effects of water, dirt, and other contaminants and also from the effects of insufficient lubrication caused by evaporation of the oil used to lubricate the chain. In addition, the housing prevents portions of the operator's or passenger's anatomy or clothing from becoming entangled in the drive chain while it is in motion and, perhaps, causing serious injury. This safety feature is especially significant where the motorcycle is operated around small children or persons wearing loose or flowing clothing.

The chain housing of the present invention may be manufactured either as an original component of the motorcycle or as an owner-installable accessory. Although the preferred embodiment was designed to fit a Honda 750cc motorcycle, relatively little modification is required to adapt the housing to fit other makes and models of motorcycles.

It is, therefore a principal feature of the present invention to provide a chain housing that completely and sealingly encloses the drive chain of a conventional motorcycle.

It is an additional objective of the present invention to provide a means for continuously lubricating the drive chain of a conventional motorcycle during operation.

It is further objective of the present invention to provide a chain housing capable of containing the drive chain of a conventional motorcycle should the chain break during operation, thereby protecting both the operator and the machine from injury or damage.

It is a still further objection of the present invention to provide a means for protecting a conventional motorcycle and the operator and passenger thereof from lubricating oil or other matter that may fly off of the moving drive chain during operation.

It is a principal advantage of the present invention that the clothing and anatomy of the operator or passenger are prevented from becoming entangled in the moving drive chain.

It is an additional feature of the present invention that it may be adapted, with only minor modification, to fit more than one make or model of motorcycle.

The foregoing objectives, features and advantages of the present invention will be more readily understood upon consideration of the following detailed description of the invention taken in conjunction with the accompanying drawings.

DESCRIPTION OF THE PREFERRED EMBODIMENT

Figure 1:
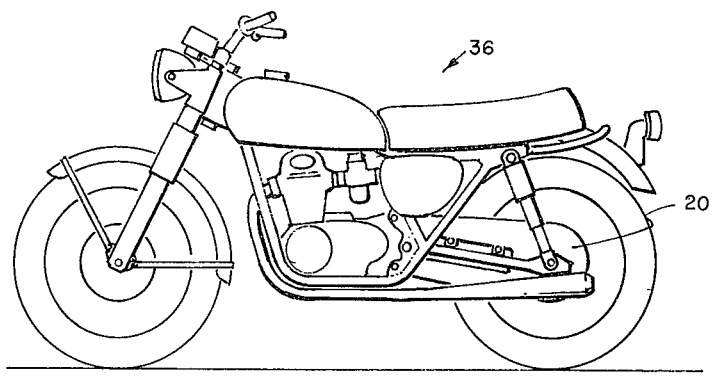
FIG. 1 is a side elevation of a conventional Honda 750cc motorcycle showing the location and placement of the chain housing of the present invention.
Figure 2:
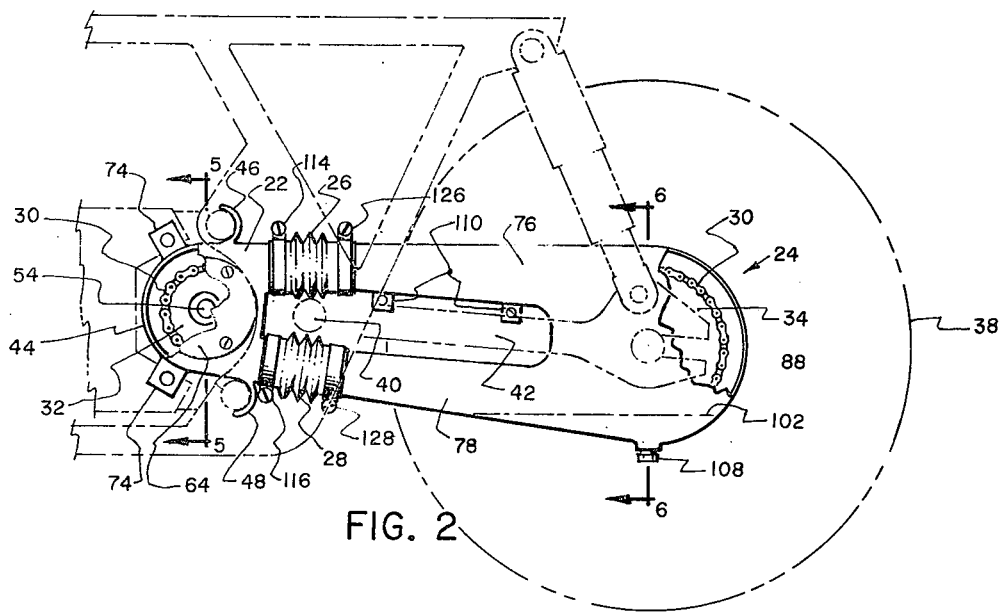
FIG. 2 is a partially phantomed elevation of the chain housing of the present invention as mounted on a conventional Honda 750cc motorcycle.

Referring to FIGS. 1 through 4, the preferred embodiment of the chain housing of the present invention, generally identified by the number 20 in FIG. 1, is seen to comprise a front housing section 22, a rear housing section 24, and two interconnecting lengths of flexible hose 26 and 28 that combine to completely enclose the endless drive chain 30 that is used to transfer rotational power from the drive sprocket 32 to the rear wheel sprocket 34 of a conventional chain-driven motorcycle 36. Front section 22 encloses drive sprocket 32 and that portion of drive chain 30 extending around the srpocket and about one-fifth of the distance back towards the rear wheel, while rear section 24 encloses rear wheel sprocket 34 and the remaining portion of the drive chain. The two housing sections are flexibly connected to one another by hose segments 26 and 28 which are short lengths of rubber or neoprene hosing capable of being flexed in all directions and compressed or extended along their longitudinal axes. This flexible connection between the front and rear sections of the chain housing is necessary to allow the chain housing to adjust to the up and down movement of the rear wheel 38 of the motorcycle caused by the weight of the operator or the surface of the road over which the motorcycle is traveling. Note, as shown in FIG. 2, that for effective flexion of the housing, the flexible hose connection must be located proximate the pivotal attachment point 40 of the frame member 42 supporting the rear wheel.

Figure 7:
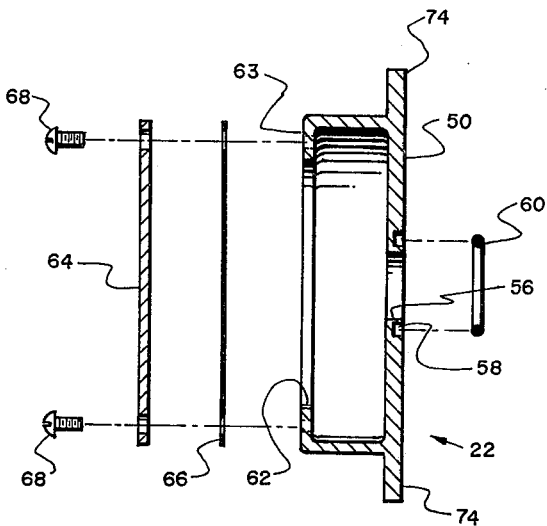
FIG. 7 is an exploded sectional view of the chain housing of the present invention taken along lines 7-7 of FIG. 3.
Figure 5:
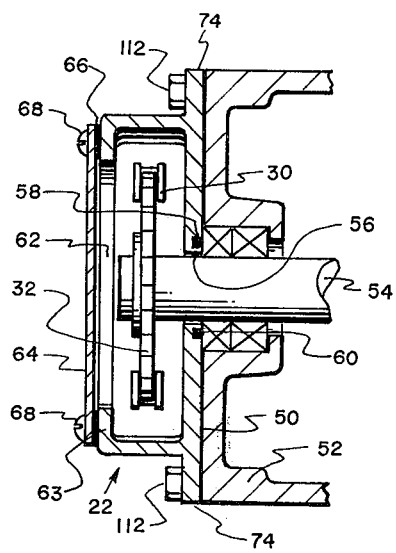
FIG. 5 is a sectional view of the chain housing of the present invention taken along lines 5—5 of FIG. 2.

The actual construction of the chain housing is more readily understood with additional reference to the remaining figures. Front section 22, shown in cross-section in FIGS. 5 and 7, is constructed of formed and welded metal sheet to define an enclosure with a substantially rectangular cross-section and of sufficient interior dimensions to enclose drive sprocket 32, but not interfere with its rotation.

The front or leading wall 44 of the enclosure is formed from a strip of one-quarter inch steel, the ends of which protrude beyond the upper and lower walls of the enclosure to form two C-shaped torque reaction members 46 and 48. These torque reaction members are positioned to engage portions of the motorcycle frame, as shown in FIG. 2, and prevent the enclosure from rotating should the drive chain break and become jammed between the walls of the enclosure and the drive sprocket while the sprocket is turning. The one-quarter inch steel leading wall will prevent the broken chain from leaving the enclosure and flying forward where it could cause serious injury or damage.

The inner wall 50 of the front housing section is formed to mate with the area of the motorcycle transmission casing 52 immediately surrounding drive shaft 54 and contains a circular aperture 56 of sufficient diameter to fit over the drive shaft once drive sprocket 32 has been removed. An annular groove 58 is formed in the exterior surface of inner wall 50 and around aperture 56, as shown in FIG. 7, to receive and retain O-ring 60 which acts as an oil-proof seal around drive shaft 54.

A second circular aperture 62 is formed in the opposite or outer wall 63 of the front housing section coaxially with aperture 56 and of sufficient diameter to allow the drive sprocket 32 to be placed on drive shaft 54 after the front housing section has been positioned over the shaft. During the operation of the motorcycle, this aperture is sealed by cover plate 64 and annular gasket 66, with cover plate 64 being secured to the housing by a plurality of screws 68 that pass through holes in the plate and gasket and thread into corresponding holes in the housing. Aperture 62 also serves as an inspection port after the chain housing is installed.

Figure 3:
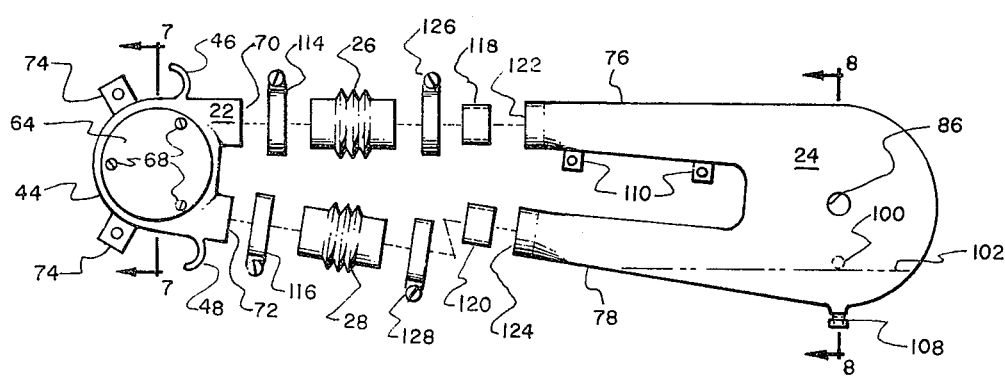
FIG. 3 is an exploded exterior side view of the chain housing of the present invention.

Formed in the rear of front housing section 22 are two rear-facing ports 70 and 72, shown most clearly in FIG. 3, that serve as entry and exit ports, respectively, for drive chain 30. Lastly, housing section 22 contains two mounting lugs 74 by which the housing is removably attached to the motorcycle transmission casing.

Figure 8:
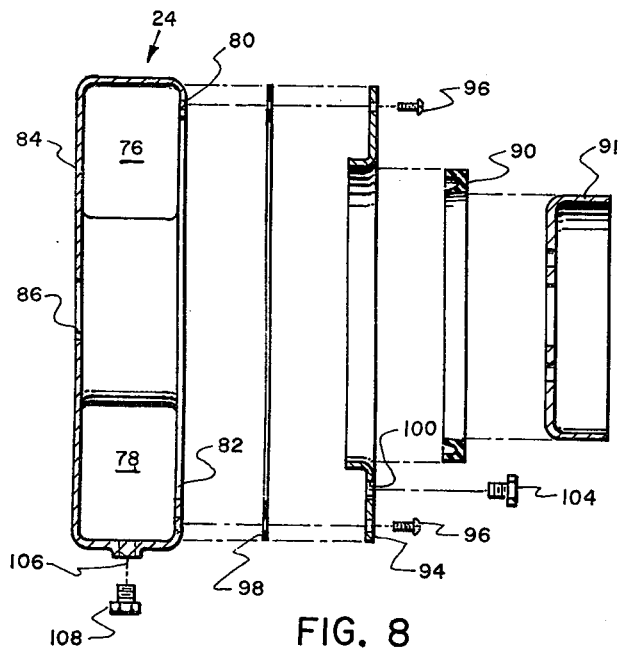
FIG. 8 is an exploded sectional view of the chain housing of the present invention taken along lines 8-8 of FIG. 3.
Figure 6:
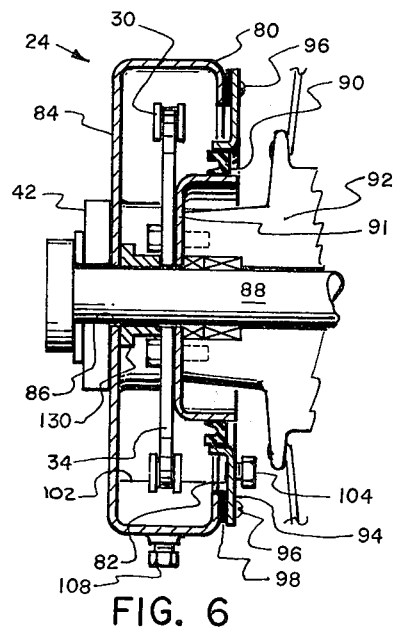
FIG. 6 is a sectional view of the chain housing of the present invention taken along lines 6—6 of FIG. 2

Rear housing section 24, shown in cross-section in FIGS. 6 and 8, is also constructed of formed and welded metal sheet and with a substantially rectangular cross-section. The interior dimensions of the housing must be sufficient to enclose rear wheel sprocket 34 without interfering with its rotation. The forward portion of housing section 24 extends forward in the form of two rectangular chain guides 76 and 78 that connect via the two hose segments 26 and 28 to chain inlet port 70 and chain outlet port 72, respectively, of front housing section 22. Once connected, the two housing sections provide a completely enclosed path through which endless drive chain 30 passes without restriction.

Formed in the inner wall 80 of housing section 24 is a circular aperture 82 of sufficient diameter to fit over rear wheel sprocket 34. Formed in the opposite or outer wall 84 and located coaxially with aperture 82 is a smaller circular aperture 86 of sufficient diameter to allow the insertion therethrough of the motorcycle's rear axle 88. A sealing interface is achieved between aperture 82 and the motorcycle rear wheel 38 by an annular lip seal 90 attached to the rear housing section and cup-shaped gland member 91 attached to the hub 92 of rear wheel 38. As shown in FIG. 6, lip seal 90 is frictionally engaged and held in position by an annular retainer plate 94 which is in turn removably attached to housing 24 by a plurality of bolts 96 passing through holes in the retainer plate and threading into corresponding holes in housing wall 80. A second seal is provided between retainer plate 94 and housing section 24 by an annular gasket 98 placed therebetween. Gland member 91 is attached to rear hub 90 by the same bolts used to attach the rear wheel sprocket.

Figure 4:
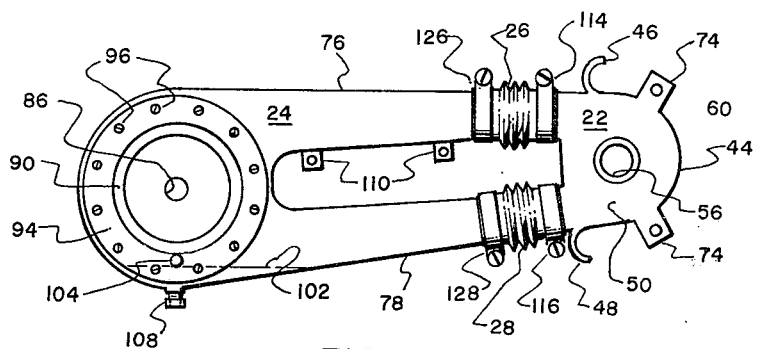
FIG. 4 is an interior side view of the chain housing of the present invention.

Also formed in the inner wall 80 of the rear housing section is a small oil filler port 100 through which oil is introduced to maintain an oil bath within the enclosure at the level indicated by the dashed line 102 in FIGS. 2, 3, and 4. Port 100 is positioned at the desired oil bath level and is sealed during operation of the motorcycle by filler plug 104 which may be a simple bolt threaded into the port. An oil drain port 106 and drain plug 108 are located at the lowermost point of the rear housing section to facilitate draining the oil bath.

Two mounting lugs 110 of sheet metal stock depend from chain guide 76 and are used to removably attach rear housing section 24 to swinging frame member 42.

To attach the chain housing to a typical chain-driven motorcycle, assuming that the motorcycle's transmission casing has been suitably modified to receive front section 22, the drive chain is first "broken" by disassembling a master link within the chain, and the drive sprocket and rear wheel are removed. Front housing section 22 is then positioned over drive shaft 54 so that torque reaction members 46 nd 48 engage the appropriate frame members and secured to the transmission casing by bolts 112 through mounting lugs 74. Sprocket 32 is reattached to drive shaft 54 through aperture 62 and the motorcycle transmission is disengaged to allow the shaft and sprocket to rotate freely. Next, one end of drive chain 30 is inserted through chain inlet port 70, around sprocket 32, and out chain outlet port 72. The two connecting hose segments 26 and 28 may now be routed over the respective loose ends of chain 30, attached to the two ports 70 and 72 and secured by hose clamps 114 and 116.

Rear housing section 24 is attached by first inserting short lengths of rectangular nylon or teflon tubing 118 and 120 into ports 122 and 124 of chain guides 76 and 78, respectively, as indicated in FIG. 3. These lengths of tubing are frictionally engaged by ports 122 and 124 and serve to prevent chain 30 from rubbing against the walls of the housing when the housing is subjected to extreme flexion in either the up or down direction. Similar lengths of tubing are not needed at front section ports 70 and 72 because of the close proximity of these ports to sprocket 32. With housing section 24 held in its approximate final position, the loose end of chain 30 coming from connecting hose 26 is threaded into port 122 through chain guide 86, down and through chain guide 88, and out through port 124 where it is reconnected to its other loose end coming out of connecting hose 28. The rear housing section is then finally positioned with ports 122 and 124 inserted into connecting hoses 26 and 28, respectively, and, with chain 30 thus enclosed, attached to frame member 42 by bolts (not shown) passing through the holes in mounting lugs 110 and threaded into the frame member. Connecting hoses 26 and 28 are secured to ports 122 and 124 by the two hose clamps 126 and 128 as shown in FIG. 4.

Next, sprocket 34 is removed from rear wheel hub 92 and retainer plate 94 with its frictionally-engaged lip seal 90 is placed over the hub along with gasket 98. Gland member 92 is then placed in position, as shown in FIG. 6, and secured to the hub, along with sprocket 32, by the same bolts originally used to secure just the sprocket. Rear wheel 38 is now positioned by inserting sprocket 34 into aperture 82 of the rear section of the housing and sliding the wheel as far forward as it will go. Since axle 88 is not in place yet, and retainer plate 94, seal 90, and gasket 98 are hanging free around hub 92, the rear wheel can be moved forward of its operating position because of the large diameter of aperture 82.

While the wheel is held forward, the rear portion of chain 30 is threaded around sprocket 34 by engaging a top or bottom sprocket tooth with a link of the chain and rotating the wheel backward or forward until the chain is threaded around the sprocket. Wheel 38 is then moved back to its operating postion and secured there by inserting axle 88. (If spacer 130, shown in FIG. 6, is used, it may be either fixedly attached to sprocket 34 or placed over a partially-inserted axle 88 before the sprocket is inserted into aperture 82.)

The installation is completed by securing retaining plate 94 to the rear housing section and front cover plate 58 to the front housing section. Once oil is introduced into the housing via oil filler port 100, the motorcycle and the chain housing are ready for operation.

Once the above procedure for attaching the housing is understood, the procedures for removal of the housing or the replacement of the chain become obvious.

The terms and expressions which have been employed in the foregoing abstract and specification are used therein as terms of description and not of limitation, and there is no intention, in the use of such terms and expressions of excluding equivalents of the features shown and described or portions thereof, it being recognized that the scope of the invention is defined and limited only by the claims which follow.

What is claimed is:

1. A chain housing, adapted for mounting on a conventional chain-driven motorcycle to enclose the drive sprocket, drive chain and rear wheel sprocket thereof, comprising:
    a. a front housing section enclosing a drive sprocket and a portion of a drive chain;
    b. a rear housing section enclosing a rear wheel sprocket and the remaining portion of said drive chain;
    c. means for flexibly coupling said front housing section to said rear housing section;
    d. means for removably attaching said rear housing section to a frame member of a motorcycle;
    e. a cup-shaped gland member removably attached to the rear wheel hub of said motorcycle; and
    f. an annular lip seal removably attached to said rear housing section and sealingly engaging said gland member.

2. The chain housing of claim 1 wherein said coupling means comprises a plurality of short lengths of flexible hose.

3. The chain housing of claim 1 further comprising means for removably attaching said front housing section to the transmission casing of a motorcycle.

4. The chain housing of claim 3 further comprising means for forming an oil-, moisture- and dirt-proof seal between said front housing section and said transmission casing.

5. The chain housing of claim 1 wherein said front housing section further comprises a reinforcing member forming the forward wall of said front housing section and having means for engaging a frame member of a motorcycle.

6. The chain housing of claim 1 further comprising means for maintaining a lubricating oil bath within said housing in which a portion of said drive chain is continually immersed.

7. The chain housing of claim 6 wherein said means for maintaining said oil bath comprises:
 a. means defining an oil filler port formed in one side of said housing at a position corresponding to the desired level of said oil bath;
 b. means defining an oil drain port formed in the lowermost part of said housing;
 c. means for opening and closing said oil filler port; and
 d. means for opening and closing said oil drain port.

8. A chain housing, adapted for mounting on a conventional chain-driven motorcycle to enclose the drive sprocket, drive chain and rear wheel sprocket thereof, comprising:
 a. a C-shaped front housing section of substantially rectangular cross-section for enclosing the drive sprocket and a portion of the drive chain of a motorcycle, said front housing section having a reinforced forward wall, means for engaging a frame member of said motorcycle, means for removable attachment to the transmission casing of said motorcycle, and two rearward facing orifices of substantially rectangular cross-section for receiving said drive chain of said motorcycle;
 b. a reverse C-shaped rear housing section of substantially rectangular cross-section for enclosing the rear wheel sprocket and the remaining portion of the drive chain of said motorcycle, said rear housing section having means for removable attachment to a frame member of said motorcycle and two forward facing orifices of substantially rectangular cross-section for receiving said drive chain of said motorcycle;
 c. means for flexibly connecting said front housing section to said rear housing section such that, when connected, said front and rear housing sections define a hollow elongated toroid of substantially rectangular cross-section;
 d. means defining a first aperture in one side of said front housing section for receiving the drive shaft of said motorcycle;
 e. means for forming an oil-, moisture- and dirtproof seal between said front housing section and the transmission casing of said motorcycle around said drive shaft;
 f. means defining a second aperture in the opposite side of said front housing section for receiving the drive sprocket of said motorcycle;
 g. means for sealingly covering said second aperture in said front housing section;
 h. means defining a first aperture in one side of said rear housing section for receiving the rear wheel sprocket of said motorcycle;
 i. a cup-shaped gland member removably attached to the rear wheel hub of said motorcycle;
 j. an annular lip seal removably attached to said rear housing section around said first aperture and sealingly engaging said gland member; and
 k. means defining a second aperture in the opposite side of said rear housing section for receiving the rear axle of said motorcycle.

9. The chain housing of claim 8 further comprising means for maintaining a lubricating oil bath within said housing in which a portion of said drive chain is continually immersed.

10. The chain housing of claim 9 wherein said means for maintaining said oil bath comprises:
 a. means defining an oil filler port formed in one side of said housing at a position corresponding to the desired level of said oil bath;
 b. means defining an oil drain port formed in the lowermost part of said housing;
 c. means for opening and closing said oil filler port; and
 d. means for opening and closing said oil drain port.

* * * * *

UNITED STATES PATENT AND TRADEMARK OFFICE
CERTIFICATE OF CORRECTION

PATENT NO. : 3,939,730

DATED : February 24, 1976

INVENTOR(S) : Robert D. DeHaan

It is certified that error appears in the above—identified patent and that said Letters Patent are hereby corrected as shown below:

Col. 2    Line 61    After "It is" insert --a--;

Line 66    Change "objection" to --objective--.

Col. 3    Line 51    Change "srpocket" to --sprocket--.

Col. 5    Line 35    Change "nd" to --and--.

*Signed and Sealed this*

*Twenty-fourth* Day of August 1976

[SEAL]

Attest:

RUTH C. MASON
*Attesting Officer*

C. MARSHALL DANN
*Commissioner of Patents and Trademarks*